United States Patent
Mori et al.

(10) Patent No.: US 12,388,142 B2
(45) Date of Patent: Aug. 12, 2025

(54) POWER STORAGE DEVICE

(71) Applicant: TOYOTA JIDOSHA KABUSHIKI KAISHA, Toyota (JP)

(72) Inventors: Shinichiro Mori, Toyota (JP); Tatsuma Yahara, Nagakute (JP); Shigeyuki Inoue, Toyota (JP); Kotaro Horiguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 586 days.

(21) Appl. No.: 17/875,989

(22) Filed: Jul. 28, 2022

(65) Prior Publication Data
US 2023/0095497 A1 Mar. 30, 2023

(30) Foreign Application Priority Data
Sep. 24, 2021 (JP) .................................. 2021-155625

(51) Int. Cl.
*H01M 50/242* (2021.01)
*H01M 50/209* (2021.01)

(52) U.S. Cl.
CPC ....... *H01M 50/242* (2021.01); *H01M 50/209* (2021.01)

(58) Field of Classification Search
CPC .............. H01M 50/242; H01M 50/209; H01M 50/293; Y02E 60/10
See application file for complete search history.

(56) References Cited

U.S. PATENT DOCUMENTS

| | | | | |
|---|---|---|---|---|
| 5,378,555 A | * | 1/1995 | Waters | H01M 50/227 180/68.5 |
| 2012/0045686 A1 | * | 2/2012 | Jung | H01M 50/264 429/159 |
| 2016/0020447 A1 | * | 1/2016 | Janarthanam | H01M 10/625 180/68.5 |
| 2022/0123420 A1 | * | 4/2022 | Morishita | H01M 50/293 |
| 2022/0190423 A1 | * | 6/2022 | Wu | H01M 50/242 |
| 2022/0294058 A1 | * | 9/2022 | Brandley | H01M 50/231 |

FOREIGN PATENT DOCUMENTS

| | | | | |
|---|---|---|---|---|
| JP | 2014-024488 A | | 2/2014 | |
| JP | 2021-018879 | * | 2/2021 | ............ H01M 50/20 |
| JP | 2021-022434 | * | 2/2021 | ............ H01M 50/20 |
| JP | 2021-022434 A | | 2/2021 | |

OTHER PUBLICATIONS

JP 2021-022434 machine English translation (Year: 2021).*
JP 2021-018879 machine English translation (Year: 2021).*

* cited by examiner

*Primary Examiner* — Michael L Dignan
(74) *Attorney, Agent, or Firm* — Dinsmore & Shohl LLP

(57) ABSTRACT

The power storage device includes a plurality of power storage stacks, a case, and a protective structure that protects a plurality of power storage cells from a load applied to the case in the vertical direction. The case has a bottom wall, a top wall, and a circumferential wall. The protective structure has a cross member, and a load transfer member located on the cross member. The load transfer member has at least one contact portion that is compressible and deformable in an orthogonal direction, and contacts a pair of power storage stacks adjacent to each other in the orthogonal direction when being in a compressed state.

8 Claims, 5 Drawing Sheets

POWER STORAGE DEVICE

CROSS-REFERENCE TO RELATED APPLICATION

This application claims priority to Japanese Patent Application No. 2021-155625 filed on Sep. 24, 2021, incorporated herein by reference in its entirety.

BACKGROUND

1. Technical Field

The disclosure relates to a power storage device.

2. Description of Related Art

For example, a battery unit disclosed in Japanese Unexamined Patent Application Publication No. 2014-24488 (JP 2014-24488 A) includes a battery case having a battery tray and a battery cover, a plurality of batteries located in the battery case, and battery brackets in the form of single plates fixed to the battery tray. The battery tray has a bottom wall, a plurality of ribs erected on the bottom wall, and a plurality of partition walls erected on the bottom wall.

SUMMARY

In the battery unit described in JP 2014-24488 A, there is a concern that if a load is applied to the case in the vertical direction, the load will be transferred to power storage cells.

The disclosure provides a power storage device that can protect power storage cells from a load applied to a case in the vertical direction.

A power storage device according to one aspect of the disclosure includes a plurality of power storage stacks each of which includes a plurality of power storage cells arranged in line in one direction, and which are arranged in line in an orthogonal direction orthogonal to both the one direction and a vertical direction, a case that houses the power storage stacks, a protective structure provided in the case and configured to protect the power storage cells from a load applied to the case in the vertical direction. The case has a bottom wall located below the power storage stacks, a top wall located above the power storage stacks, and a circumferential wall that is connected to the periphery of the bottom wall and the periphery of the top wall and surrounds the power storage stacks. The protective structure has a cross member and a load transfer member located on the cross member. The cross member is located on the bottom wall and between a pair of power storage stacks adjacent to each other in the orthogonal direction, and the cross member is shaped to extend in the one direction and connected to the circumferential wall. The load transfer member has at least one contact portion that is compressible and deformable in the orthogonal direction and is configured to contact the pair of power storage stacks adjacent to each other in the orthogonal direction when being in a compressed state.

According to the disclosure, the power storage device that can protect the power storage cells from the load applied to the case in the vertical direction can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
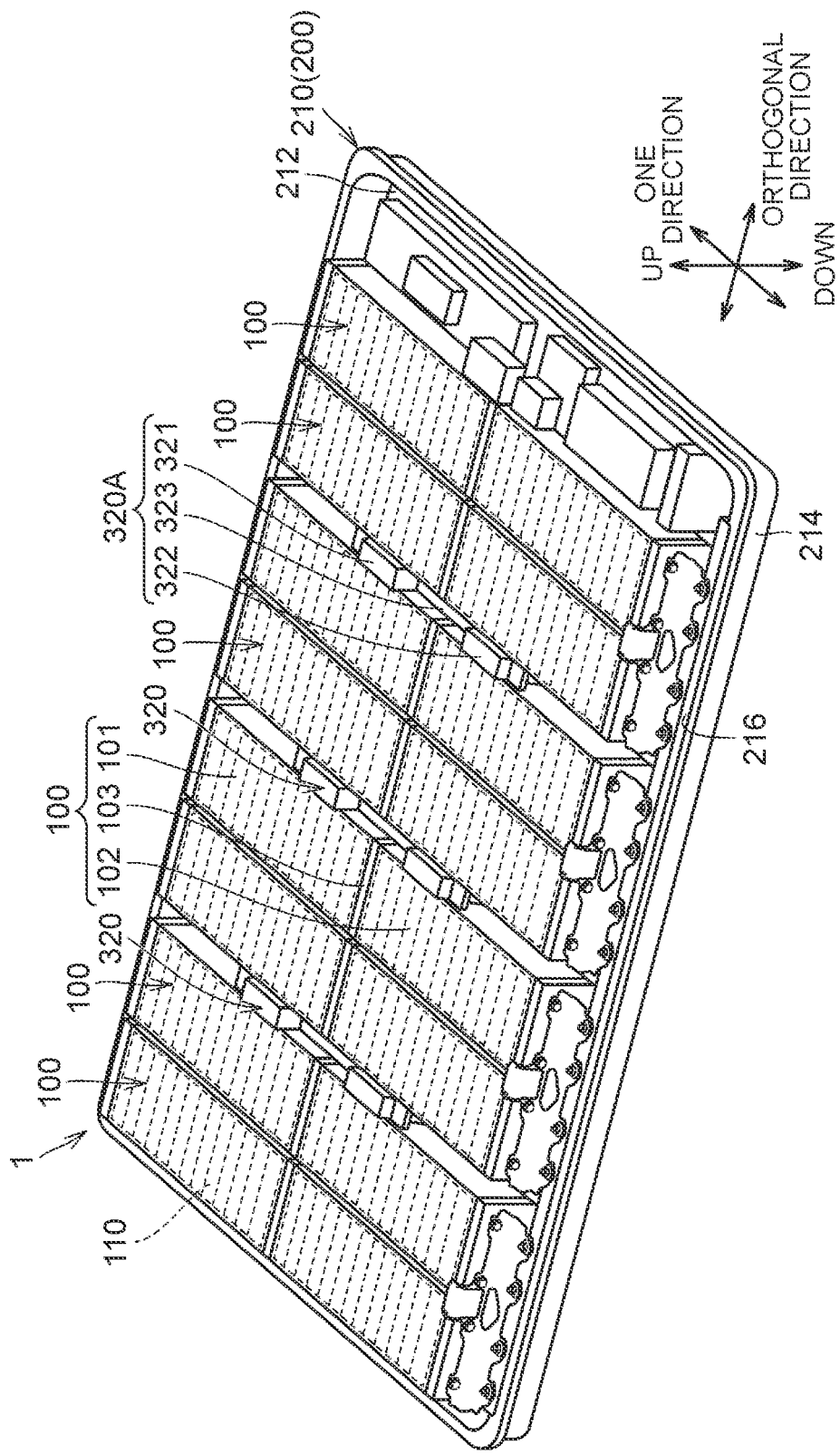
FIG. 1 is a perspective view schematically showing the configuration of a power storage device according to one embodiment of the disclosure.

One embodiment of the disclosure will be described with reference to the drawings. In the drawings referred to below, the same reference signs are assigned to the same or corresponding components or portions.

FIG. 1 is a perspective view schematically showing the configuration of a power storage device as one embodiment of the disclosure. The power storage device 1 is installed in a vehicle, for example.

Figure 2:
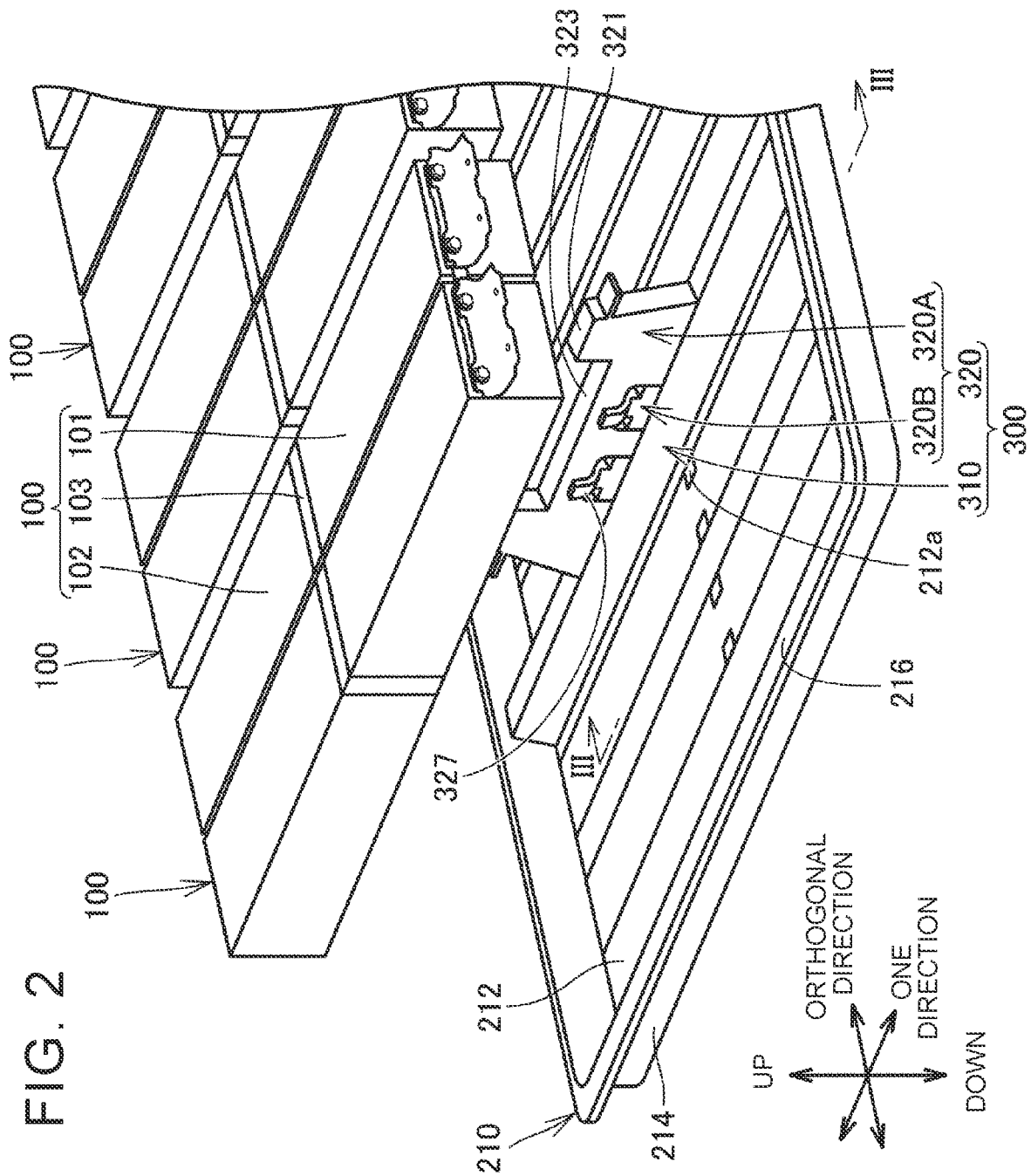
FIG. 2 is a perspective view schematically showing a condition before power storage stacks are placed in a lower case.
Figure 3:
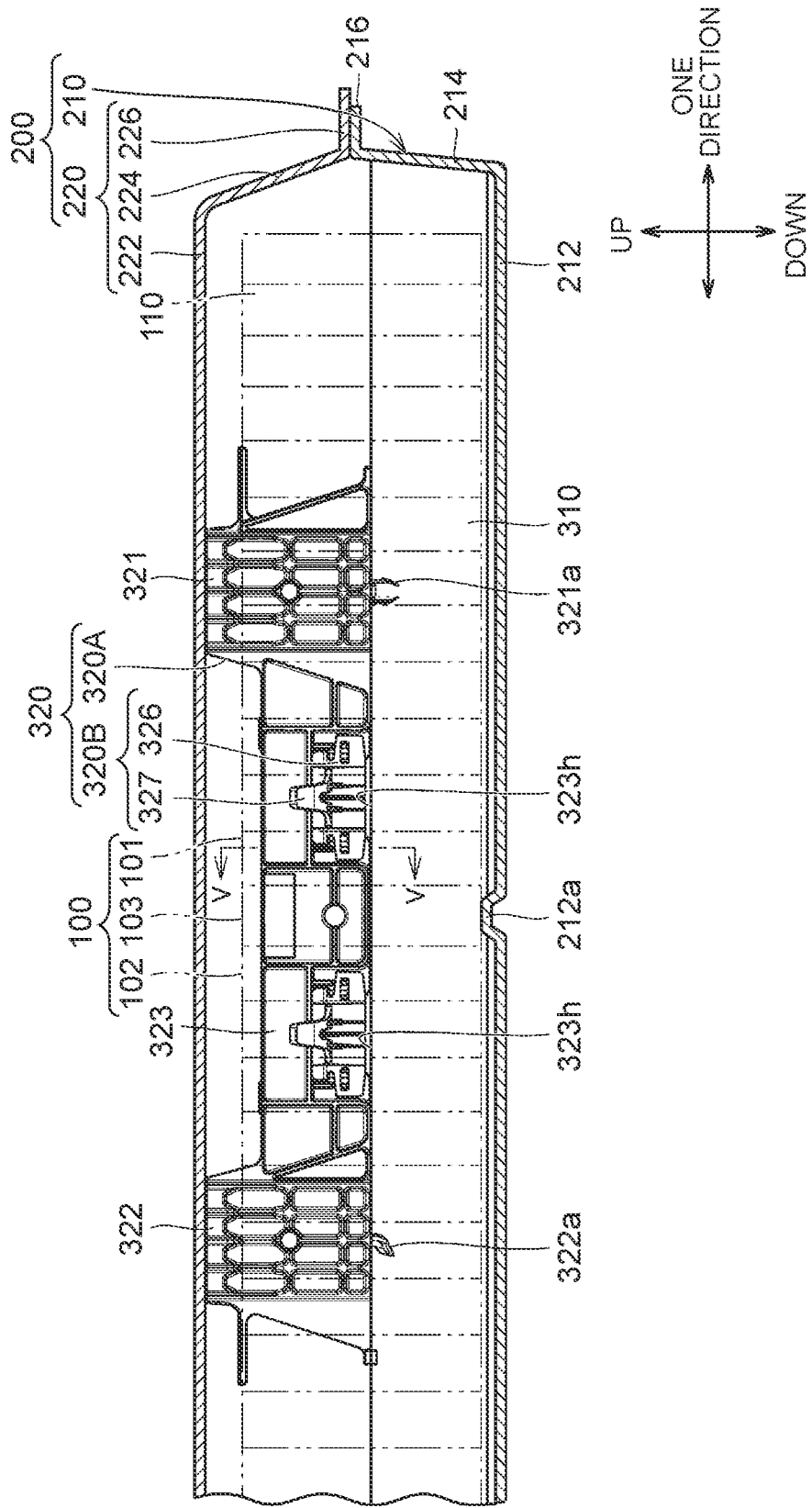
FIG. 3 is a cross-sectional view taken along line in FIG. 2.

As shown in FIG. 1 to FIG. 3, the power storage device 1 includes a plurality of power storage stacks 100, a case 200, and protective structures 300.

As shown in FIG. 1, each of the power storage stacks 100 has a plurality of power storage cells 110 arranged in line in one direction. The power storage cells 110 are, for example, lithium-ion cells. Each power storage cell 110 is in the form of a rectangular parallelepiped. As shown in FIG. 1, the power storage stacks 100 are arranged in line in an orthogonal direction orthogonal to both the above-indicated one direction and the vertical direction.

Each power storage stack 100 has a first unit stack 101, a second unit stack 102, and a middle plate 103.

The first unit stack 101 is located on one side in the one direction. The first unit stack 101 includes power storage cells as a part of the power storage cells 110. The first unit stack 101 may include an end plate. The end plate is located outside the outermost power storage cell 110 in the one direction.

The second unit stack 102 is located on the other side in the one direction. The second unit stack 102 includes power storage cells 110 other than the power storage cells 110 included in the first unit stack 101, out of the plurality of power storage cells 110. In this embodiment, the number of the power storage cells 110 included in the second unit stack 102 is the same as the number of the power storage cells 110 included in the first unit stack 101. The second unit stack 102 may include an end plate located outside the power storage cells 110 in the one direction.

The middle plate 103 is located between the first unit stack 101 and the second unit stack 102. The middle plate 103 is located in the middle of the power storage stack 100 in the one direction. The middle plate 103 is formed of synthetic resin, for example.

The case 200 houses the power storage stacks 100. The case 200 has a lower case 210 and an upper case 220 (see FIG. 3). In FIG. 1 and FIG. 2, the upper case 220 is not illustrated.

The lower case 210 is shaped to open upward. The lower case 210 is formed of metal or synthetic resin, for example.

The lower case 210 has a bottom wall 212, a lower surrounding wall 214, and a lower flange 216.

The bottom wall 212 is located below the power storage stacks 100. As shown in FIG. 2 and FIG. 3, raised portions 212a that rise upward are formed in a middle portion of the bottom wall 212 in the one direction. The top of the raised portion 212a is formed flat. As shown in FIG. 3, the middle plate 103 is placed on the raised portions 212a.

The lower surrounding wall 214 rises from the periphery of the bottom wall 212, and surrounds lower portions of the power storage stacks 100.

The lower flange 216 is shaped to extend outward from the upper end portion of the lower surrounding wall 214.

The upper case 220 is shaped to open downward. The upper case 220 cooperates with the lower case 210 to house the power storage stacks 100. The upper case 220 is formed of metal or synthetic resin, for example. The upper case 220 has a top wall 222, an upper surrounding wall 224, and an upper flange 226.

The top wall 222 is located above the power storage stacks 100. The top wall 222 may be formed like a flat plate. A clearance is formed between the top wall 222 and each power storage stack 100.

The upper surrounding wall 224 extends downward from the periphery of the top wall 222, and surrounds upper portions of the power storage stacks 100. The upper surrounding wall 224 and the lower surrounding wall 214 constitute a circumferential wall. The circumferential wall 214, 224 connects the periphery of the bottom wall 212 with the periphery of the top wall 222, and surrounds the power storage stacks 100.

The upper flange 226 is shaped to extend outward from the lower end portion of the upper surrounding wall 224. The upper flange 226 is fixed to the lower flange 216 with bolts, or the like.

Figure 4:
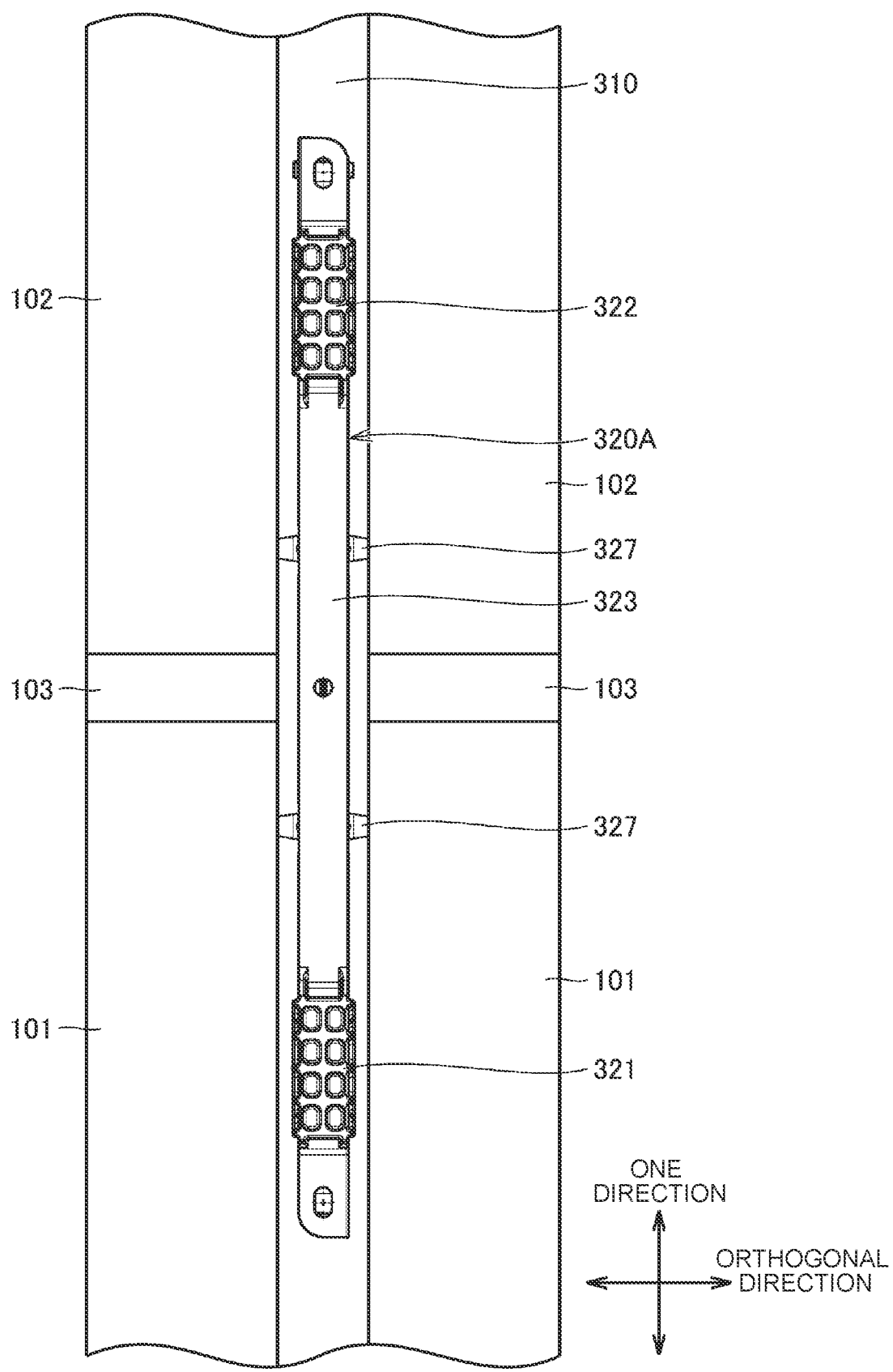
FIG. 4 is a plan view schematically showing the positional relationship between a load transfer member and middle plates.

The protective structures 300 are provided in the case 200 for protecting the power storage cells 110 from a load applied to the case 200 in the vertical direction. As shown in FIG. 3, the length of the protective structure 300 measured in the vertical direction is larger than the length of the power storage cells 110 measured in the vertical direction. As shown in FIG. 4, the protective structure 300 is located between a pair of middle plates 103 adjacent to each other in the orthogonal direction. In this embodiment, the protective structure 300 has a cross member 310 and a load transfer member 320. The first unit stack 101, second unit stack 102, and middle plate 103 are indicated by two-dot chain lines in FIG. 3, and the first unit stacks 101 and second unit stacks 102 are simply depicted in FIG. 4. In fact, after the power storage stacks 100 are mounted to the lower case 210, the load transfer members 320 are placed on the cross members 310. However, FIG. 2 shows a condition before the power storage stacks 100 are housed in the lower case 210, for convenience.

The cross member 310 is located on the bottom wall 212. The cross member 310 extends in the one direction, and is connected to the lower surrounding wall 214. Namely, the cross member 310 has the function of reinforcing the lower surrounding wall 214. The cross section of the cross member 310 in the plane orthogonal to the one direction is shaped to be convex upward. In some embodiments, the upper face of the cross member 310 is formed flat. The cross member 310 is located between a pair of power storage stacks 100 adjacent to each other in the orthogonal direction. Namely, the cross member 310 provides a partition between a pair of power storage stacks 100 adjacent to each other in the orthogonal direction.

The load transfer member 320 is located on the cross member 310. The load transfer member 320 transfers the load applied downward to the top wall 222, to the cross member 310. The load transfer member 320 transfers the load applied upward to the bottom wall 212, to the top wall 222. The load transfer member 320 is formed of synthetic resin, for example. As shown in FIG. 4, the load transfer member 320 is located between a pair of middle plates 103 adjacent to each other in the orthogonal direction.

As shown in FIG. 2 and FIG. 3, the load transfer member 320 has a transfer member body 320A and a pair of positioning members 320B. The transfer member body 320A has a first pillar portion 321, a second pillar portion 322, and a connecting portion 323.

The first pillar portion 321 is located on the cross member 310. The upper end portion of the first pillar portion 321 may be in contact with the top wall 222, or may be spaced apart from the top wall 222. As shown in FIG. 3, a first engaging portion 321a is provided at a lower end portion of the first pillar portion 321, and the first engaging portion 321a is engaged with a first mounting hole (not shown) provided in the upper face of the cross member 310. In FIG. 3, the first engaging portion 321a is indicated by solid lines, though it should actually be indicated by broken lines.

The second pillar portion 322 is located on the cross member 310. The second pillar portion 322 is positioned at a distance from the first pillar portion 321 in the one direction. The upper end portion of the second pillar portion 322 may be in contact with the top wall 222, or may be spaced apart from the top wall 222. As shown in FIG. 3, a second engaging portion 322a is provided at a lower end portion of the second pillar portion 322, and the second engaging portion 322a is engaged with a second mounting hole (not shown) provided in the upper face of the cross member 310. In FIG. 3, the second engaging portion 322a is indicated by solid lines, though it should actually be indicated by broken lines.

The connecting portion 323 connects the first pillar portion 321 with the second pillar portion 322. As shown in FIG. 3 and FIG. 4, the connecting portion 323 is located between a pair of middle plates 103 adjacent to each other in the orthogonal direction. The connecting portion 323 is provided with through-holes 323h that extend through the connecting portion 323 in the orthogonal direction.

Each of the positioning members 320B is located in the corresponding through-hole 323h of the connecting portion 323, and is fixed to the connecting portion 323. Each positioning member 320B sandwiches the transfer member body 320A and contacts the pair of power storage stacks 100 adjacent to each other in the orthogonal direction, thereby to determine the position of the transfer member body 320A between the power storage stacks 100. As shown in FIG. 3, each positioning member 320B has a middle portion 326 and contact portions 327.

Figure 5:
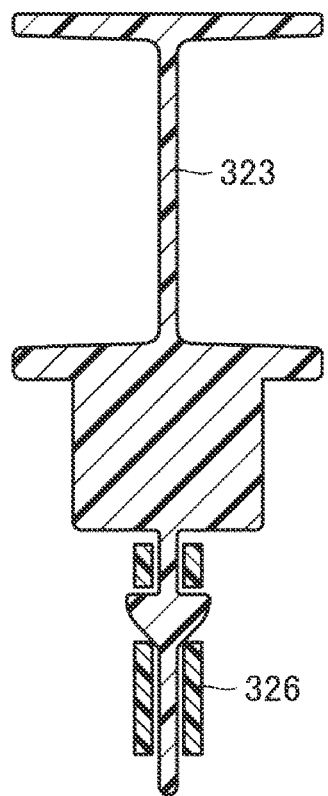
FIG. 5 is a cross-sectional view taken along line V-V in FIG. 3.

As shown in FIG. 3 and FIG. 5, the middle portion 326 sandwiches the connecting portion 323.

The contact portions 327 are connected to the upper end portion of the middle portion 326. The contact portions 327 are compressible and deformable in the orthogonal direction (the lateral direction in FIG. 4). More specifically, the contact portion 327 is gradually directed upward in a direction away from the middle portion 326 in the orthogonal direction, and is curved to be convex downward. The contact portion 327 is cantilevered and supported by the middle portion 326. The contact portions 327, which are in a compressed state where they are compressed in the orthogonal direction, are in contact with the corresponding pair of power storage stacks 100 adjacent to each other in the orthogonal direction. The contact portions 327 receive the load applied in the orthogonal direction to the circumferential wall 214, 224.

As described above, in the power storage device 1 of this embodiment, when a downward load is applied to the top wall 222, the load is transferred to the bottom wall 212 via the protective structures 300. When an upward load is applied to the bottom wall 212, the load is transferred to the top wall 222 via the protective structures 300. Thus, the load applied to the case 200 in the vertical direction is less likely or unlikely to be transferred to the power storage cells 110.

Furthermore, the load transfer member 320 has the contact portions 327 that contact the corresponding pair of power storage stacks 100 when being in the compressed state; therefore, the load transfer member 320 is less likely or unlikely to be displaced relative to the power storage stacks 100 and the cross member 310 due to vibration, etc. Thus, generation of abnormal noise caused by collision of the load transfer member 320 with the power storage stacks 100 or the cross member 310 is curbed.

In addition, mounting of the load transfer member 320 to the cross member 310 is completed by inserting the first engaging portion 321*a* and second engaging portion 322*a* into the respective mounting holes of the cross member 310. Thus, the load transfer member 320 can be easily mounted to the cross member 310. Also, centering of the load transfer member 320 in the orthogonal direction during mounting thereof can be performed easily.

It is understood by those skilled in the art that the exemplary embodiment described above is a specific example of the following aspects.

The power storage device in the above embodiment includes a plurality of power storage stacks each of which includes a plurality of power storage cells arranged in line in one direction and which are arranged in line in an orthogonal direction orthogonal to both the one direction and a vertical direction, a case that houses the power storage stacks, and a protective structure that is provided in the case and protects the power storage cells from a load applied to the case in the vertical direction. The case has a bottom wall located below the power storage stacks, a top wall located above the power storage stacks, and a circumferential wall that is connected to the periphery of the bottom wall and the periphery of the top wall and surrounds the power storage stacks. The protective structure has a cross member and a load transfer member located on the cross member. The cross member is located on the bottom wall and between a pair of the power storage stacks adjacent to each other in the orthogonal direction, and the cross member is shaped to extend in the one direction and connected to the circumferential wall. The load transfer member has at least one contact portion that is compressible and deformable in the orthogonal direction and contacts the pair of the power storage stacks adjacent to each other in the orthogonal direction when being in a compressed state.

In the power storage device, when a downward load is applied to the top wall, the load is transferred to the bottom wall via the protective structure. When an upward load is applied to the bottom wall, the load is transferred to the top wall via the protective structure. Thus, the load applied to the case in the vertical direction is less likely or unlikely to be transferred to the power storage cells.

Furthermore, the load transfer member has the contact portion that contacts a pair of power storage stacks when being in the compressed state; therefore, the load transfer member is less likely or unlikely to be displaced relative to the power storage stacks and the cross member due to vibrations, etc. Thus, generation of abnormal noise caused by collision of the load transfer member with the power storage stacks or the cross member is curbed.

In some embodiments, the length of the protective structure measured in the vertical direction is larger than the length of the power storage stacks measured in the vertical direction.

In some embodiments, the above-indicated at least one contact portion includes a pair of contact portions positioned to be spaced apart from each other in the one direction.

In some embodiments, the load transfer member further has a first pillar portion, a second pillar portion positioned to be spaced apart from the first pillar portion in the one direction, and a connecting portion that connects the first pillar portion and the second pillar portion.

With this arrangement, the vertical load can be transferred by the first pillar portion and the second pillar portion at positions spaced apart from each other in the one direction, and, furthermore, the first pillar portion and the second pillar portion are connected by the connecting portion. This makes it easier to handle the load transfer member as compared with the case where the first pillar portion and the second pillar portion are formed as separate members.

In some embodiments, the above-indicated at least one contact portion is connected to the connecting portion.

The embodiment disclosed herein should be considered as being exemplary in all respects and not restrictive. The scope of the disclosure is defined by the claims rather than the above description of the embodiment, and includes all changes within the meaning and scope equivalent to the claims.

What is claimed is:

1. A power storage device comprising:
  a plurality of power storage stacks each including a plurality of power storage cells arranged in line in one direction, the power storage stacks being arranged in line in an orthogonal direction orthogonal to both the one direction and a vertical direction;
  a case that houses the power storage stacks; and
  a protective structure provided in the case and configured to protect the power storage cells from a load applied to the case in the vertical direction,
  wherein the case has a bottom wall located below the power storage stacks, a top wall located above the power storage stacks, and a circumferential wall that is connected to a periphery of the bottom wall and a periphery of the top wall and surrounds the power storage stacks,
  wherein the protective structure has a cross member and a load transfer member located on the cross member, the cross member being located on the bottom wall and between a pair of the power storage stacks adjacent to each other in the orthogonal direction, the cross member being shaped to extend in the one direction and connected to the circumferential wall,
  wherein the load transfer member has at least one contact portion that is compressible and deformable in the orthogonal direction and is configured to contact the pair of the power storage stacks adjacent to each other in the orthogonal direction when being in a compressed state, and
  wherein the load transfer member further has a first pillar, a second pillar positioned to be spaced apart from the first pillar in the one direction, and a connecting portion that connects the first pillar and the second pillar.

2. The power storage device according to claim 1, wherein a length of the protective structure measured in the vertical direction is larger than a length of the power storage stacks measured in the vertical direction.

3. The power storage device according to claim 1, wherein the at least one contact portion includes a pair of contact portions positioned to be spaced apart from each other in the one direction.

4. The power storage device according to claim 1, wherein the at least one contact portion is connected to the connecting portion.

5. The power storage device according to claim 1, wherein the first pillar and the second pillar extend above the connecting portion.

6. The power storage device according to claim 1, wherein the contact portion is between the first pillar and the second pillar.

7. The power storage device according to claim 1, further comprising a positioning member supported on the cross member.

8. The power storage device according to claim 7, wherein the connecting portion has a through hole, and the positioning member is located in the through hole.

\* \* \* \* \*